United States Patent
Uno

(10) Patent No.: US 6,437,947 B1
(45) Date of Patent: Aug. 20, 2002

(54) MAGNETIC DISK, MAGNETIC RECORDING AND REPRODUCING METHOD AND MAGNETIC DISK UNIT

(75) Inventor: Hiroshi Uno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/925,365

(22) Filed: Sep. 8, 1997

(30) Foreign Application Priority Data

Mar. 17, 1997 (JP) ............................................. 9-063205

(51) Int. Cl.⁷ .............................................. G11B 5/596
(52) U.S. Cl. ........................ 360/278.04; 360/75; 360/76
(58) Field of Search ........................... 360/75, 76, 18, 360/77.01, 78.04, 77.04, 78.08, 48

(56) References Cited

U.S. PATENT DOCUMENTS

| | | | | |
|---|---|---|---|---|
| 4,847,715 A | * | 7/1989 | Kumasaka et al. | 360/122 |
| 4,945,438 A | * | 7/1990 | Matsumoto et al. | 360/76 X |
| 5,123,006 A | * | 6/1992 | Lemelson | 360/18 X |
| 5,289,328 A | | 2/1994 | Saliba | |
| 5,293,281 A | * | 3/1994 | Behr et al. | 360/77.07 |
| 5,724,212 A | * | 3/1998 | Mallary et al. | 360/76 X |
| 5,859,740 A | * | 1/1999 | Takeda et al. | 360/77.02 |
| 5,940,237 A | * | 8/1999 | Takagi | 360/75 |
| 6,031,682 A | * | 2/2000 | Nelson | 360/77.12 |

FOREIGN PATENT DOCUMENTS

| | | |
|---|---|---|
| DE | 19522008 | 2/1996 |
| EP | 0347102 | 12/1989 |
| JP | 57-18060 | 1/1982 |
| JP | 57-105805 | 7/1982 |
| JP | 61-45409 | 3/1986 |
| JP | 62-6423 | 1/1987 |
| JP | 3-12076 | 1/1991 |

OTHER PUBLICATIONS

Submicron–Trackwidth Inductive/MR Composite Head Hisashi Takano, Hirotsugu Fukuoka, Mikio Suzuki, Kazuo Shiiki, Masahiro Kitada—Central Research Laboratory, Hitachi, Ltd., Kokubunji, Tokyo 185, Japan.

IBM Technical Disclosure Bulletin, vol. 33, No. 5, Oct. 1990—Zone Recording With Two–Head Slider.

* cited by examiner

*Primary Examiner*—David Hudspeth
*Assistant Examiner*—K. Wang
(74) *Attorney, Agent, or Firm*—Greer, Burns & Crain, Ltd.

(57) ABSTRACT

Signals are recorded on and reproduced from a magnetic disk by a head with an azimuth angle which changes depending on a radial position on the magnetic disk. The magnetic disk includes a first recording region having tracks recorded with an azimuth angle less than or equal to a predetermined value, a second recording region having tracks recorded with an azimuth angle greater than the predetermined value, and an overlapping region in which two mutually adjacent tracks overlap in a radial direction of the magnetic disk, where a track pitch of the tracks within the first recording region is different from a track pitch of the tracks within the second recording region.

27 Claims, 11 Drawing Sheets

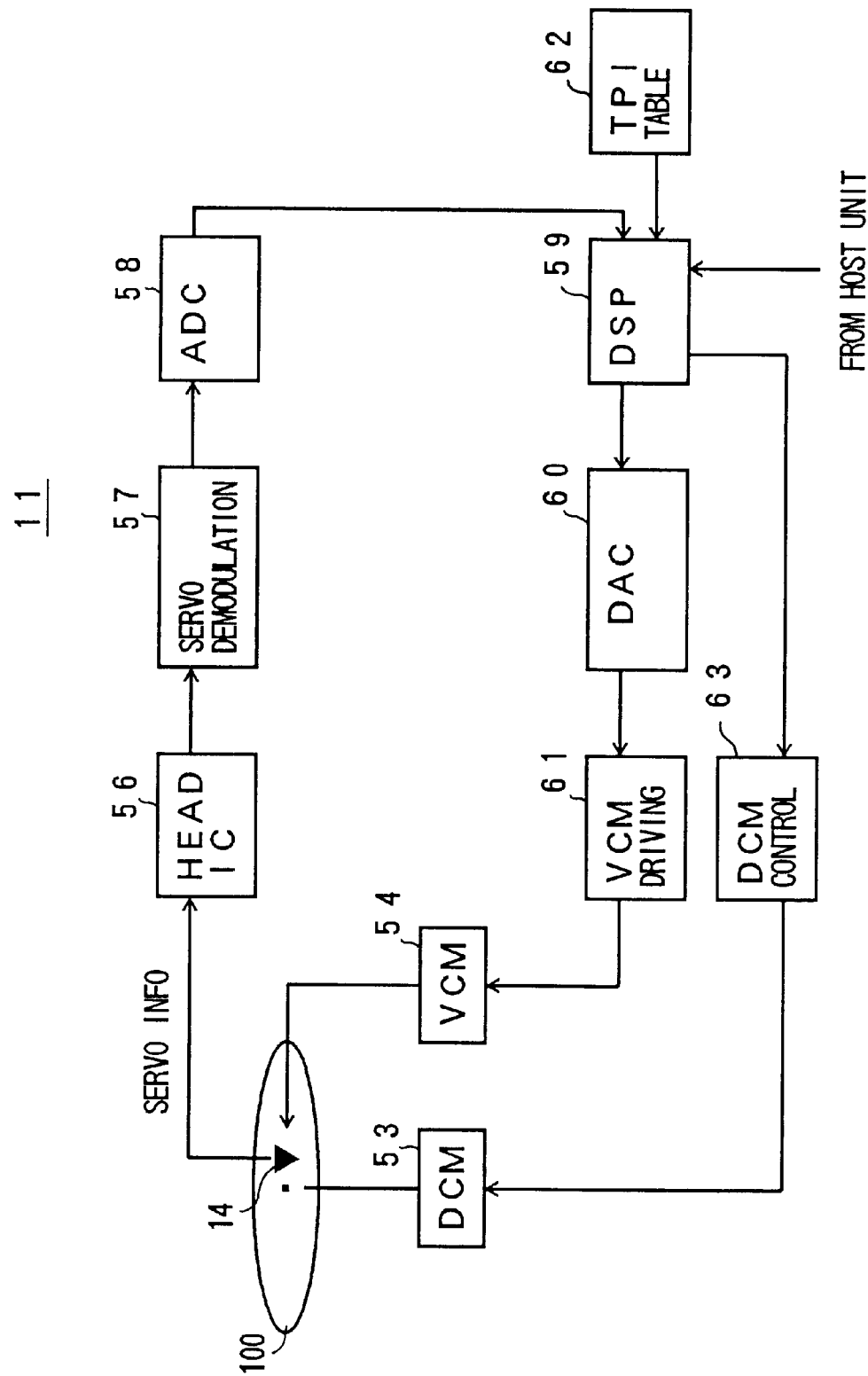

MAGNETIC DISK, MAGNETIC RECORDING AND REPRODUCING METHOD AND MAGNETIC DISK UNIT

BACKGROUND OF THE INVENTION

The present invention generally relates to magnetic disks, magnetic recording and reproducing methods and magnetic disk units, and more particularly to a magnetic disk, a magnetic recording and reproducing apparatus and a magnetic disk unit which magnetically record and reproduce signals with a high density.

Recently, the recording density of the magnetic disk has increased considerably. There are several reasons for the increased recording density of the magnetic disk, and the realization of a magneto-resistance effect type head (hereinafter simply referred to as a MR head) using a magneto-resistance element is one of the reasons for the increased recording density. The MR head can detect with a high sensitivity the magnetization states recorded on the magnetic disk, thereby making it possible to magnetically record and reproduce signals with a high density.

The MR head can only reproduce the signals recorded on the magnetic disk, and thus, the signals are usually recorded on the magnetic disk using a thin film head. For this reason, the magnetic disk unit is provided with a write head for recording the signals and a read head for reproducing the signals.

The write head and the read head are provided on an actuator which moves these heads generally in a radial direction of the magnetic disk. But although the write head and the read head are provided close together as much as possible, these heads are inevitably separated by a predetermined distance in a direction approximately perpendicular to the radial direction of the magnetic disk.

In addition, due to the demands to reduce the size of the magnetic disk unit or the like, the actuator is in most cases turned rather than being moved linearly. When the actuator is turned, an angle formed by each head and a track on the magnetic disk becomes different depending on the position of each head. For example, an azimuth angle is different at an inner peripheral portion of the magnetic disk and an outer peripheral portion of the magnetic disk. As a result, each head deviates in opposite directions with respect to the track at the inner peripheral portion of the magnetic disk and at the outer peripheral portion of the magnetic disk.

If the read head deviates with respect to a target track at the time of reproducing the signals due to the azimuth angle described above, the read head can only scan a portion of the target track. In addition, the read head also scans a portion of a track which is adjacent to the target track which is to be scanned, thereby mixing noise into the reproduced signals. Consequently, the read head cannot reproduce the signals recorded on the magnetic disk in a satisfactory manner. For this reason, a so-called wide-write/narrow-read is carried out, wherein the signals are recorded on the magnetic disk by a wide write head and the recorded signals are reproduced from the magnetic disk by a narrow read head. In the case of the wide-write/narrow-read, the signals are recorded on the magnetic disk by the wide write head which is wider than the narrow read head. As a result, even if the narrow read head deviates with respect to the target track due to the azimuth angle, the narrow read head only scans the target track which is to be scanned, and the signal-to-noise (S/N) ratio of the reproduced signal is improved.

However, when the wide-write/narrow-read is employed, the S/N ratio of the reproduced signals is improved because the signals are recorded using the wide write head, but there was a problem in that the recording density of the magnetic disk becomes poor. In other words, employing the wide-write/narrow-read described above did not agree with the object of using the MR head as the read head in order to realize the high density recording and reproduction.

On the other hand, the track pitch wave conventionally set constant for the entire recording region of the magnetic disk. The track pitch is determined by a sum of the width of the write head and the width of a dead space which is required in order to reduce the crosstalk from the adjacent track. Accordingly, in order to prevent the undesirable effects of the crosstalk from the adjacent track, it was not possible to greatly reduce the track pitch. In other words, there was another problem in that it is impossible to greatly improve the recording density of the magnetic disk without deteriorating the S/N ratio of the reproduced signals.

SUMMARY OF THE INVENTION

Accordingly, it is a general object of the present invention to provide a novel and useful magnetic disk, magnetic recording and reproducing apparatus and magnetic disk unit, in which the problems described above are eliminated.

Another and more specific object of the present invention is to provide a magnetic disk, magnetic recording and reproducing apparatus and magnetic disk unit, which can improve the recording density of the magnetic disk without deteriorating the S/N ratio of the reproduced signals.

Still another object of the present invention is to provide a magnetic disk on which signals are recorded on and reproduced from a head with an azimuth angle which changes depending on a radial position on the magnetic disk, the magnetic disk comprising a first recording region having tracks recorded with an azimuth angle less than or equal to a predetermined value, a second recording region having tracks recorded with an azimuth angle greater than the predetermined value, and an overlapping region in which two mutually adjacent tracks overlap in a radial direction of the magnetic disk, where a track pitch of the tracks within the first recording region is different from a track pitch of the tracks within the second recording region. According to the magnetic disk of the present invention, it is possible to improve the S/N ratio of the reproduced signals and improve the data reliability, and further, it is possible to realize a high-density recording and reproduction.

Another object of the present invention is to provide a magnetic recording and reproducing method for recording signals on and reproducing signals from a magnetic disk by a head having an azimuth angle which changes depending on a radial position on the magnetic disk, the magnetic recording and reproducing method comprising the steps of (a) recording signals on tracks having a first track pitch with an azimuth angle less than or equal to a predetermined value with respect to a first recording region of the magnetic disk, and recording signals on tracks having a second track pitch which is different from the first track pitch with an azimuth angle greater than the predetermined value with respect to a second recording region of the magnetic disk, the first recording region being different from the second recording region, and (b) reproducing signals from the first recording region with the azimuth angle less than equal to the predetermined value, and reproducing signals from the second recording region with the azimuth angle greater than the predetermined value, the step (a) recording the signals on each of the tracks so that two mutually adjacent tracks overlap in a radial direction of the magnetic disk within an overlapping region located in at least a part of the first recording region. According to the magnetic recording and reproducing method of the present invention, it is possible to improve the S/N ratio of the reproduced signals and improve the data reliability, and further, it is possible to realize a high-density recording and reproduction.

Another object of the present invention is to provide a magnetic recording and reproducing method for recording signals on and reproducing signals from a magnetic disk by a head having an azimuth angle which changes depending on a radial position on the magnetic disk, the magnetic recording and reproducing method comprising the steps of (a) recording signals on tracks having a first track pitch with an azimuth angle less than or equal to a predetermined value with respect to a first recording region of the magnetic disk, and recording signals on tracks having a second track pitch which is different from the first track pitch with an azimuth angle greater than the predetermined value with respect to a second recording region of the magnetic disk, the first recording region being different from the second recording region, and (b) reproducing signals from the first recording region with the azimuth angle less than equal to the predetermined value, and reproducing signals from the second recording region with the azimuth angle greater than the predetermined value, where the step (b) uses a read head having a center which is offset generally in a radial direction of the magnetic disk with respect to a center of a write head used by the step (a). According to the magnetic recording and reproducing method of the present invention, it is possible to realize a high-density recording and reproduction without deteriorating the S/N ratio of the reproduced signals.

Still another object of the present invention is to provide a magnetic recording and reproducing method for recording signals on and reproducing signals from a magnetic disk by a head having an azimuth angle which changes depending on a radial position on the magnetic disk, the magnetic recording and reproducing method comprising the steps of (a) recording signals on tracks having a first track pitch with an azimuth angle less than or equal to a predetermined value with respect to a first recording region of the magnetic disk, and recording signals on tracks having a second track pitch which is smaller than the first track pitch with an azimuth angle greater than the predetermined value with respect to a second recording region of the magnetic disk, the first recording region being different from the second recording region, and (b) reproducing signals from the first recording region with the azimuth angle less than equal to the predetermined value, and reproducing signals from the second recording region with the azimuth angle greater than the predetermined value. According to the magnetic recording and reproducing method of the present invention, it is possible to realize a high-density recording and reproduction without deteriorating the S/N ratio of the reproduced signals.

A further object of the present invention is to provide a magnetic disk unit for recording signals on and reproducing signals from a magnetic disk using a head having an azimuth angle which changes depending on a radial position on the magnetic disk, comprising a write head recording signals on tracks of the magnetic disk, a read head reproducing signals from the tracks, a moving mechanism moving the write head and the read head generally in a radial direction of the magnetic disk in a state where the write head and the read head are separated in a direction approximately perpendicular to the radial direction of the magnetic disk, and control means for controlling an amount the write head and the read head are moved by the moving mechanism, where the control means controls the moving mechanism so that the write head records signals on tracks having a first track pitch with an azimuth angle less than or equal to a predetermined value with respect to a first recording region of the magnetic disk, and records signals on tracks having a second track pitch which is different from the first track pitch with an azimuth angle greater than the predetermined value with respect to a second recording region of the magnetic disk, so that two mutually adjacent tracks overlap in the radial direction of the magnetic disk within an overlapping region located in at least a part of the first recording region, the first recording region being different from the second recording region, and the control means controls the moving mechanism so that the read head reproduces signals from the first recording region with the azimuth angle less than equal to the predetermined value, and reproduces signals from the second recording region with the azimuth angle greater than the predetermined value. According to the magnetic disk unit of the present invention, According to the magnetic disk unit of the present invention, it is possible to improve the S/N ratio of the reproduced signals and improve the data reliability, and further, it is possible to realize a high-density recording and reproduction.

Another object of the present invention is to provide a magnetic disk unit for recording signals on and reproducing signals from a magnetic disk using a head having an azimuth angle which changes depending on a radial position on the magnetic disk, comprising a write head recording signals on tracks of the magnetic disk, a read head reproducing signals from the tracks, a moving mechanism moving the write head and the read head generally in a radial direction of the magnetic disk in a state where the write head and the read head are separated in a direction approximately perpendicular to the radial direction of the magnetic disk, and control means for controlling an amount the write head and the read head are moved by the moving mechanism, where the control means controls the moving mechanism so that the write head records signals on tracks having a first track pitch with an azimuth angle less than or equal to a predetermined value with respect to a first recording region of the magnetic disk, and records signals on tracks having a second track pitch which is different from the first track pitch with an azimuth angle greater than the predetermined value with respect to a second recording region of the magnetic disk, so that two mutually adjacent tracks overlap in the radial direction of the magnetic disk within an overlapping region located in at least a part of the first recording region, the first recording region being different from the second recording region, the control means controls the moving mechanism so that the read head reproduces signals from the first recording region with the azimuth angle less than equal to the predetermined value, and reproduces signals from the second recording region with the azimuth angle greater than the predetermined value, and the read head has a center which is offset generally in the radial direction of the magnetic disk with respect to a center of the write head. According to the magnetic disk unit of the present invention, it is possible to realize a high-density recording and reproduction without deteriorating the S/N ratio of the reproduced signals.

Still another object of the present invention is to provide a magnetic disk unit for recording signals on and reproducing signals from a magnetic disk using a head having an azimuth angle which changes depending on a radial position on the magnetic disk, comprising a write head recording signals on tracks of the magnetic disk, a read head reproducing signals from the tracks, a moving mechanism moving the write head and the read head generally in a radial direction of the magnetic disk in a state where the write head and the read head are separated in a direction approximately perpendicular to the radial direction of the magnetic disk, and control means for controlling an amount the write head and the read head are moved by the moving mechanism, where the control means controls the moving mechanism so that the write head records signals on tracks having a first track pitch with an azimuth angle less than or equal to a predetermined value with respect to a first recording region of the magnetic disk, and records signals on tracks having a second track pitch which is smaller than the first track pitch with an azimuth angle greater than the predetermined value with respect to a second recording region of the magnetic disk, the first recording region being different from the second recording region, and the control means controls the moving mechanism so that the read head reproduces signals from the first recording region with the azimuth angle less than equal to the predetermined value, and reproduces signals from the second recording region with the azimuth angle greater than the :predetermined value. According to the magnetic disk unit of the present invention, it is possible to realize a high-density recording and reproduction without deteriorating the S/N ratio of the reproduced signals.

Other objects and further features of the present invention will be apparent from the following detailed description when read in conjunction with the accompanying drawings.

BRIEF DESCRIPTION OF THE DRAWINGS

FIG. 16 is a system block diagram showing the general construction of a control system of the first embodiment of the magnetic disk unit.

DESCRIPTION OF THE PREFERRED EMBODIMENTS

A head having an azimuth angle which changes depending on a radial position on a magnetic disk according to the present invention, is used to record signals on and reproduce signals from the magnetic disk. A recording region of the magnetic disk includes a first recording region having tracks recorded with an azimuth angle which is a predetermined value or less, and a second recording region having tracks recorded with an azimuth angle which is greater than the predetermined value. The track pitch within the first recording region is different from that within the second recording region. In other words, the track pitch within the first recording region is smaller than or is greater than the track pitch within the second recording region.

A dead space may be provided between adjacent tracks of the magnetic disk.

In addition, the adjacent tracks may overlap in the radial direction of the magnetic disk in a portion of at least one of the first and second recording regions.

A magnetic recording and reproducing method according to the present invention and a magnetic disk unit according to the present invention record signals on and reproduce signals from the magnetic disk according to the present invention described above.

According to the present invention, it is possible to improve the recording density of the magnetic disk without deteriorating the S/N ratio of the reproduced signals.

First, a description will be given of a first embodiment of the magnetic disk according to the present invention, by referring to FIGS. 1 through 4.

Figure 1:
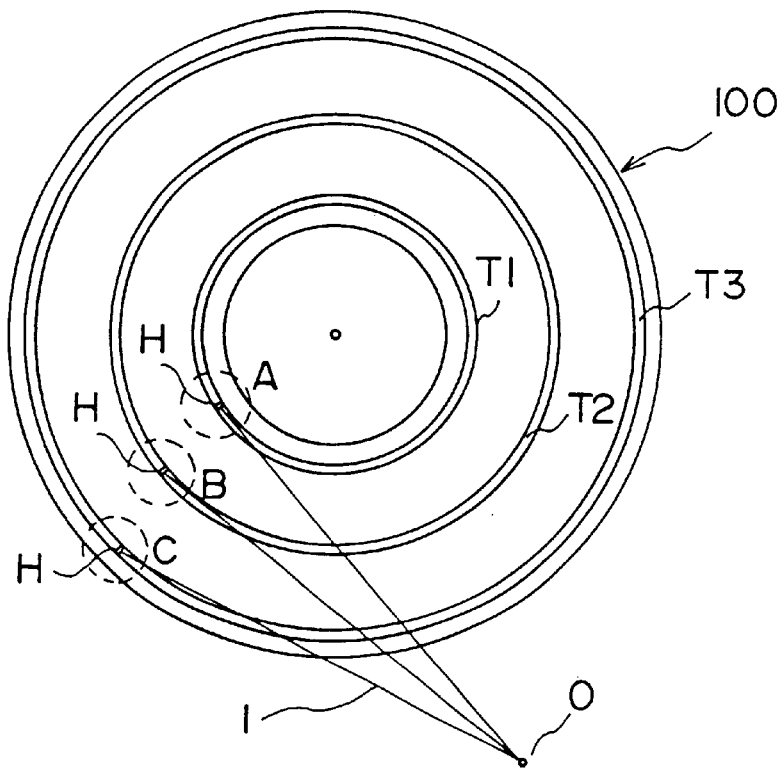
FIG. 1 is a diagram for explaining an azimuth angle of a head with respect to a track depending on a position on a magnetic disk.

Due to the demands to reduce the size of the magnetic disk unit or the like, it is more popular to run an actuator rather than moving the actuator linearly. But when an actuator 1 is turned about a point O as shown in FIG. 1, an angle formed by a head H and each of tracks T1 through T3 on a magnetic disk 100 differs depending on the position of the head H on the magnetic disk 100. For example, if it is assumed for the sake of convenience that the azimuth angle of the head H with respect to the track T1 is zero at a portion A shown in FIG. 1, the azimuth angle of the head H is generated with respect to the tracks T2 and T3 at portions B and C on the outer peripheral side of the magnetic disk 100 relative to the portion A. As a result, the head H deviates with respect to the tracks T1 through T3 in opposite directions on the inner peripheral side and on the outer peripheral side of the magnetic disk 100. For the sake of convenience, a write head and a read head are represented by the single head H in FIG. 1, but the deviation of the head H with respect to the track T occurs for both the write head and the read head.

The "azimuth angle" can be defined as an inclination of the direction of the magnetic flux inversion with respect to the normal to the moving direction of the recording medium (magnetic disk) when writing data to or reading data from the recording medium (magnetic disk). This azimuth angle occurs when the magnetic head turns about the point O in FIG. 1.

If the read head deviates with respect to a target track which is to be scanned due to the azimuth angle described above, the read head can only scan a portion of the target track. In addition, the read head also scans a portion of a track which is adjacent to the target track. As a result, noise is mixed into the reproduced signals, and it is impossible to reproduce the recorded signals from the magnetic disk 100 in a satisfactory manner. For this reason, the so-called wide-write/narrow-read is carried out in this embodiment, so that the signals are recorded on the magnetic disk 100 by a wide write head and the recorded signals are reproduced from the magnetic disk 100 by a narrow read head. In other words, the signals are recorded on the magnetic disk 100 by the wide write head which is wider than the narrow read head. As a result, even if the narrow read head deviates with respect to the target track due to the azimuth angle, the narrow read head only scans the target track which is to be scanned, and the S/N ratio of the reproduced signal is improved.

Figure 2:
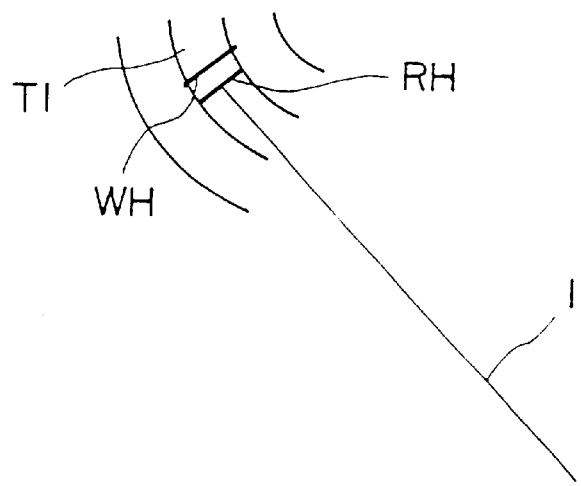
FIG. 2 is a diagram, on an enlarged scale, showing a case where a write head and a read head are positioned on a track at an inner peripheral portion of a first embodiment of the magnetic disk according to the present invention.
Figure 3:
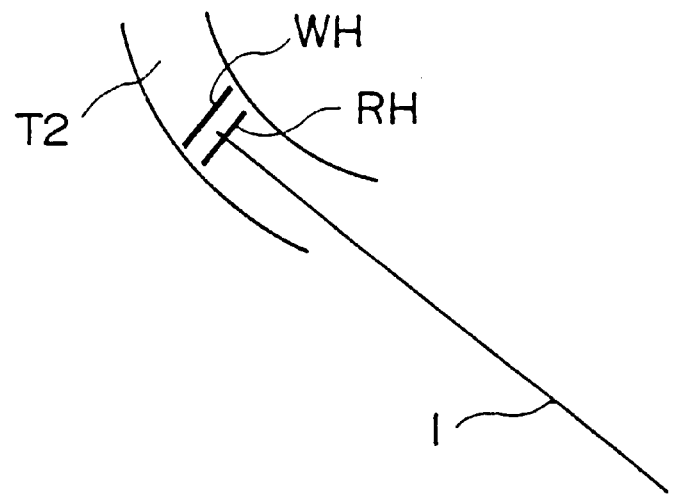
FIG. 3 is a diagram, on an enlarged scale, showing a case where the write head and the read head are positioned on a track at an intermediate portion of the first embodiment of the magnetic disk.
Figure 4:
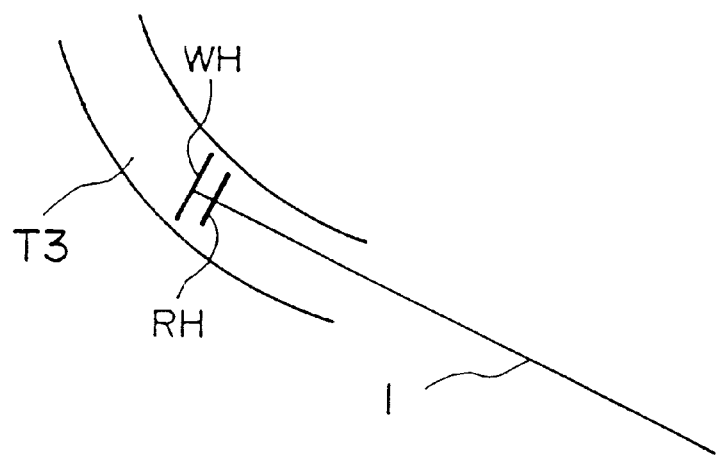
FIG. 4 is a diagram, on an enlarged scale, showing a case where the write head and the read head are positioned on a track at an outer peripheral portion of the first embodiment of the magnetic disk.

FIG. 2 is a diagram, on an enlarged scale, showing a case where a write head WH and a read head RH provided on the actuator 1 are positioned on the track T1 at the inner peripheral portion A of the magnetic disk 100. FIG. 3 is a diagram, on an enlarged scale, showing a case where the write head WH and the read head RH are positioned on the track T2 at the intermediate portion B of the magnetic disk 100. Further, FIG. 4 is a diagram, on an enlarged scale, showing a case where the write head WH and the read head RH are positioned on the track T3 at the outer peripheral portion C of the magnetic disk 100.

In this embodiment, when the write head WH and the read head RH are positioned on a track T1 at the inner peripheral portion A of the magnetic disk 100, a direction taken along the width of each of the heads WH and RH and a direction in which the track T1 extends are approximately perpendicular to each other as shown in FIG. 2 and the azimuth angle is approximately zero. However, as the heads WH and RH move to the intermediate portion B and the outer peripheral portion C of the magnetic disk 100, the azimuth angle increases as shown in FIGS. 3 and 4.

In addition, when a center along the width of the write head WH and a center along the width of the read head RH match, a reproducing region of the read head RH shifts towards a recording region of the write head WH, that is, towards the edge portion of the recorded track, as the read head RH moves towards the outer peripheral side of the magnetic disk 100 where the azimuth angle increases. For this reason, in order to suppress the effects of the crosstalk from the adjacent track, the track pitch which is the distance between center lines of two adjacent tracks is set to a sum of the width of the write head WH and a width of a dead space DS which is provided to reduce the crosstalk from the adjacent track, at least at the outer peripheral portion C of the magnetic disk 100 shown in FIG. 1. By setting the track pitch in this manner, the read head RH will not reproduce the adjacent track even if the read head RH shifts towards the edge portion of the track T3. As a result, it is possible to suppress the effects of the crosstalk from the adjacent track, and a satisfactory S/N ratio of the reproduced signals can be maintained.

On the other hand, since the azimuth angle is approximately zero at the inner peripheral portion A of the magnetic disk 100, the read head RH will not shift towards the edge portion of the track T1 at the inner peripheral portion A, and the center of the track T1 and the center of the read head RH approximately match. For this reason, at the inner peripheral portion A of the magnetic disk 100, the dead space DS for reducing the crosstalk from the adjacent track is unnecessary, and the effects of the crosstalk from the adjacent track can be suppressed by setting the track pitch equal to the width of the write head WH. In other words, at the inner peripheral portion A of the magnetic disk 100, the satisfactory S/N ratio of the reproduced signals can be maintained even if the track pitch is set smaller than that at the outer peripheral portion C of the magnetic disk. Therefore, the recording density of the magnetic disk 100 can be improved without sacrificing the S/N ratio f the reproduced signals.

According to this embodiment, the recording region of the magnetic disk 100 is constructed so that the track pitch within a first recording region having the tracks recorded with an azimuth angle less than or equal to a predetermined value is set smaller than the track pitch within a second recording region having the tracks recorded with an azimuth angle greater than the predetermined value. Hence, it is possible to improve the recording density of the magnetic disk 100 without sacrificing the S/N ratio of the reproduced signals.

Figure 5:
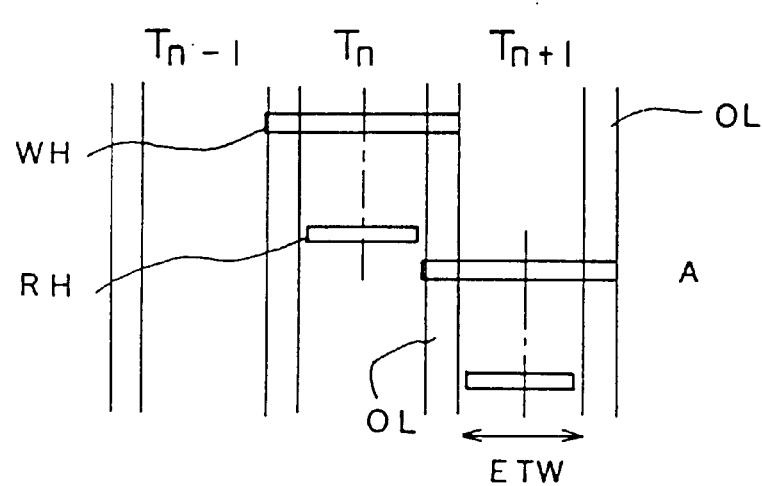
FIG. 5 is a diagram, on an enlarged scale, showing a case where the write head and the read head are positioned on a track at an inner peripheral portion of a second embodiment of the magnetic disk according to the present invention.
Figure 6:
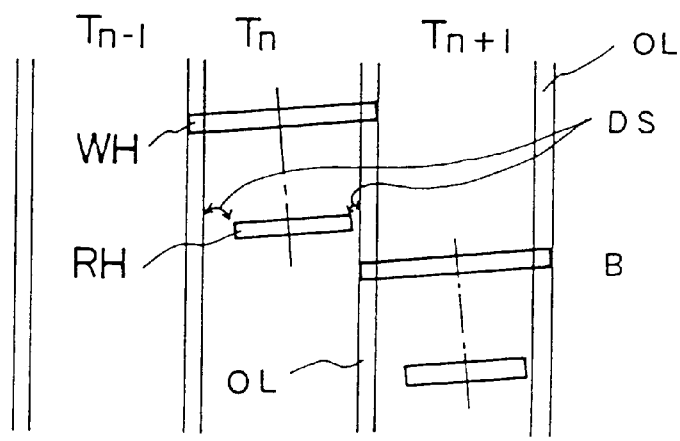
FIG. 6 is a diagram, on an enlarged scale, showing a case where the write head and the read head are positioned on a track at an intermediate portion of the second embodiment of the magnetic disk.
Figure 7:
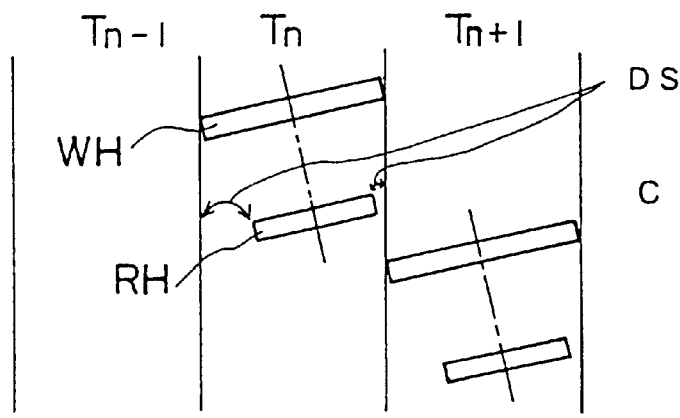
FIG. 7 is a diagram, on an enlarged scale, showing a case where the write head and the read head are positioned on a track at an outer peripheral portion of the second embodiment of the magnetic disk.

Next, a description will be given of a second embodiment of the magnetic disk according to the present invention, by referring to FIGS. 5 through 7. In FIGS. 5 through 7, those parts which are the same as those corresponding parts in FIGS. 1 through 4 are designated by the same reference numerals, and a description thereof will be omitted.

As described above in conjunction with the first embodiment, when the center along the width of the write head WH and the center along the width of the read head RH match, the reproducing region of the read head RH shifts towards the recording region of the write head WH, that is, towards the edge portion of the recorded track, as the read head RH moves towards the outer peripheral side of the magnetic disk 100 where the azimuth angle increases. For this reason, in order to suppress the effects of the crosstalk from the adjacent track, the track pitch is set to a sum of the width of the write head WH and the width of the dead space DS, at least at the outer peripheral portion C of the magnetic disk 100 shown in FIG. 1. In other words, at the outer peripheral portion C of the magnetic disk 100, the write head WH records the signals so that the adjacent tracks do not overlap. By setting the track pitch in this manner, the read head RH will not reproduce the adjacent track even if the read head RH shifts towards the edge portion of the track at the outer peripheral portion C of the magnetic disk 100. As a result, it is possible to suppress the effects of the crosstalk from the adjacent track, and a satisfactory S/N ratio of the reproduced signals can be maintained.

On the other hand, since the azimuth angle is approximately zero at the inner peripheral portion A of the magnetic disk 100 shown in FIG. 1, the read head RH will not shift towards the edge portion of the track at the inner peripheral portion A, and the center of the track which is scanned and the center of the read head RH approximately match. For this reason, at the inner peripheral portion A of the magnetic disk 100, it is possible to suppress the effects of the crosstalk from the adjacent track by setting an effective track width ETW to a sum of the width of the read head RH and the width of the dead space DS. That is, at the inner peripheral portion A of the magnetic disk 100, a satisfactory S/N ratio of the reproduced signals can be maintained even if the track pitch is set small than that at the outer peripheral portion C, and the recording density of the magnetic disk 100 can be improved without sacrificing the S/N ratio of the reproduced signals/. Therefore, in this second embodiment, the write head WH records the signals so that the adjacent tracks overlap at the inner peripheral portion A of the magnetic disk 100.

In addition, in FIG. 1, although a slight azimuth angle exists at the intermediate portion B of the magnetic disk 100, the extent of the shift of the read head RH towards the edge portion of the track at the intermediate portion B is small compared to the case where the track at the outer peripheral portion C is scanned. For this reason, it is possible to suppress the effects of the crosstalk from the adjacent track even if the track pitch at the intermediate portion B of the magnetic disk 100 is set smaller than the width of the write head WH. In other words, even if the track pitch at the intermediate portion B of the magnetic disk 100 is set smaller than that at the outer peripheral portion C, it is possible to maintain a satisfactory S/N ratio of the reproduced signals at the intermediate portion B, and the recording density of the magnetic disk 100 can be improved without sacrificing the S/N ratio of the reproduced signals. Hence, in this embodiment, the write head WH records the signals so that the adjacent tracks overlap, even at the intermediate portion B of the magnetic disk 100.

FIG. 5 is a diagram, on an enlarged scale, showing a case where the write head WH and the read head RH provided on the actuator 1 are positioned on the tracks $T_n$ and $T_{n+1}$ at the inner peripheral portion A of the magnetic disk 100. FIG. 6 is a diagram, on an enlarged scale, showing a case where the write head WH and the read head RH are positioned on the tracks $T_n$ and $T_{n+1}$ at the intermediate portion B of the magnetic disk 100. Further, FIG. 7 is a diagram, on an enlarged scale, showing a case where the write head WH and the read head RH are positioned on the tracks $T_n$ and $T_{n+1}$ at the outer peripheral portion C of the magnetic disk 100.

In this embodiment, when the write head WH and the read head RH are positioned on the track at the inner peripheral portion A of the magnetic disk 100, the direction taken along the width of each of the heads WH and RH and the direction in which the track extends are approximately perpendicular to each other as shown in FIG. 5, and the azimuth angle is approximately zero. However, as the heads WH and RH move towards the intermediate portion B and the outer peripheral portion C of the magnetic disk 100, the azimuth angle increases as shown in FIGS. 6 and 7. In addition, a width of an overlap OL of the two adjacent tracks $T_n$ and $T_{n+1}$ in the radial direction of the magnetic disk 100 when the write head WH scans the adjacent tracks $T_n$ and $T_{n+1}$ is set larger towards the inner peripheral side of the magnetic disk 100, that is, set larger as the azimuth angle becomes smaller. The width of the overlap OL of the adjacent tracks $T_n$ and $T_{n+1}$ is a minimum at the outer peripheral side of the magnetic disk 100 where the azimuth angle becomes a maximum, and is a maximum at the inner peripheral side of the magnetic disk 100 where the azimuth angle becomes a minimum.

The overlap OL of the adjacent tracks $T_n$ and $T_{n+1}$ is a region which is not used for the signal reproduction, but the track pitch can be reduced by the overlapping region. The effects of the crosstalk from the adjacent track can be suppressed by setting the effective track width ETW to a sum of the width of the read head RH and the width of the dead space DS which is provided to reduce the crosstalk from the adjacent track. The overlap OL of the adjacent tracks $T_n$ and $T_{n+1}$ is the minimum at the outer peripheral side of the magnetic disk 100, and the dead space DS for reducing the crosstalk from the adjacent track is provided at the outer peripheral side of the magnetic disk 100 if necessary.

Next, a description will be given of a third embodiment of the magnetic disk according to the present invention, by referring to FIGS. 8 through 10.

Figure 8:
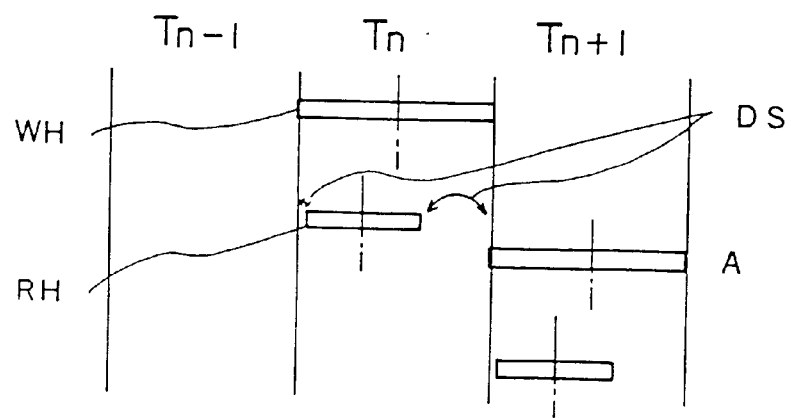
FIG. 8 is a diagram, on an enlarged scale, showing a case where the write head and the read head are positioned on a track at an inner peripheral portion of a third embodiment of the magnetic disk according to the present invention.
Figure 9:
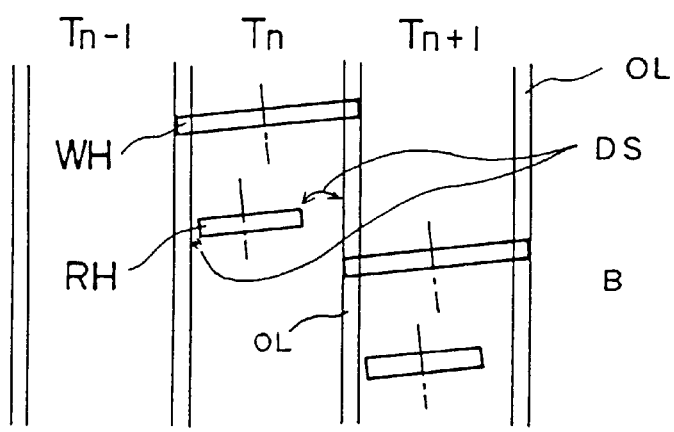
FIG. 9 is a diagram, on an enlarged scale, showing a case where the write head and the read head are positioned on a track at an intermediate portion of the third embodiment of the magnetic disk.
Figure 10:
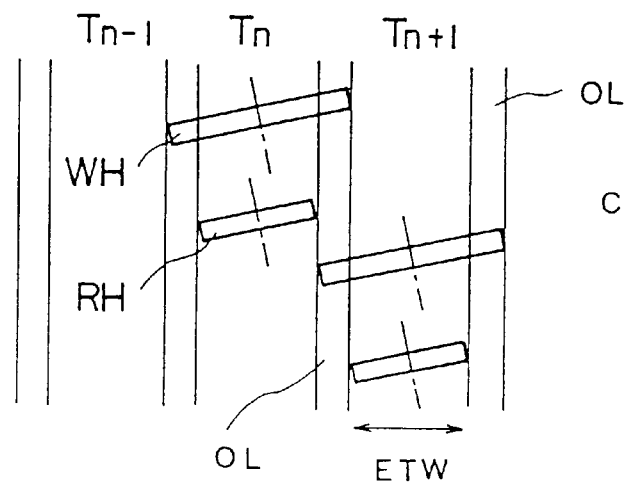
FIG. 10 is a diagram, on an enlarged scale, showing a case where the write head and the read head are positioned on a track at an outer peripheral portion of the third embodiment of the magnetic disk.

In FIGS. 8 through 10, those parts which are the same as those corresponding parts in FIGS. 1 through 4 are designated by the same reference numerals, and a description thereof will be omitted.

In this embodiment, the signals are recorded on the magnetic disk 100 in a state where the center along the width of the write head WH and the center along the width of the read head RH are offset approximately along the radial direction of the magnetic disk 100. In this case, the reproducing region of the read head RH shifts towards the recording region of the write head WH, that is, towards the edge portion of the recorded track, as the read head RH moves towards the inner peripheral side of the magnetic disk 100 where the azimuth angle becomes smaller. For this reason, in order to suppress the effects of the crosstalk from the adjacent track, the track pitch is set to a sum of the width of the write head WH and the width of the dead space DS which is provided to reduce the crosstalk from the adjacent track, at least at the inner peripheral portion A of the magnetic disk 100 shown in FIG. 1. In other words, at the inner peripheral portion A of the magnetic disk 100, the write head WH records the signals so that the adjacent tracks do not overlap. By setting the track pitch in this manner, the read head RH will not reproduce the adjacent track even if the read head RH shifts towards the edge portion of the track at the inner peripheral portion A. As a result, it is possible to suppress the effects of the crosstalk from the adjacent track, and a satisfactory S/N ratio of the reproduced signals can be maintained.

On the other hand, since the azimuth angle increases towards the outer peripheral side of the magnetic disk 100 shown in FIG. 1, the read head RH will not shift towards the edge portion of the track at the outer peripheral portion C of the magnetic disk 100, and the center of the scanned track and the center of the read head RH approximately match. For this reason, at the outer peripheral portion C of the magnetic disk 100, it is possible to suppress the effects of the crosstalk from the adjacent track by setting the effective track width ETW to a sum of the width of the read head RH and the width of the dead space DS which is provided to reduce the crosstalk from the adjacent track. In other words, at the outer peripheral portion C of the magnetic disk 100, it is possible to maintain a satisfactory S/N ratio of the reproduced signals even if the track pitch is set smaller than that at the inner peripheral portion A of the magnetic disk 100, and thus, the recording density of the magnetic disk 100 can be improved without sacrificing the S/N ratio of the reproduced signals.

Therefore, in this embodiment, the write head WH records the signals so that the adjacent tracks overlap at the outer peripheral portion C of the magnetic disk 100.

In addition, in FIG. 1, although a slight azimuth angle exists at the intermediate portion B of the magnetic disk 100, the extent of the shift of the read head RH towards the edge portion of the track at the intermediate portion B is small compared to the case where the track at the inner peripheral portion A is scanned. For this reason, it is possible to suppress the effects of the crosstalk from the adjacent track even if the track pitch at the intermediate portion B of the magnetic disk 100 is set smaller than the width of the write head WH. In other words, even if the track pitch at the intermediate portion B of the magnetic disk 100 is set smaller than that at the inner peripheral portion A, it is possible to maintain a satisfactory S/N ratio of the reproduced signals at the intermediate portion B, and the recording density of the magnetic disk 100 can be improved without sacrificing the S/N ratio of the reproduced signals. Hence, in this embodiment, the write head WH records the signals so that the adjacent tracks overlap, even at the intermediate portion B of the magnetic disk 100.

FIG. 8 is a diagram, on an enlarged scale, showing a case where the write head WH and the read head RH provided on the actuator 1 are positioned on the tracks $T_n$ and $T_{n+1}$ at the inner peripheral portion A of the magnetic disk 100. FIG. 9 is a diagram, on an enlarged scale, showing a case where the write head WH and the read head RH are positioned on the tracks $T_n$ and $T_{n+1}$ at the intermediate portion B of the magnetic disk 100. Further, FIG. 10 is a diagram, on an enlarged scale, showing a case where the write head WH and the read head RH are positioned on the tracks $T_n$ and $T_{n+1}$ at the outer peripheral portion C of the magnetic disk 100.

In this embodiment, when the write head WH and the read head RH are positioned on the track at the inner peripheral portion A of the magnetic disk 100, the direction taken along the width of each of the heads WH and RH and the direction in which the track extends are approximately perpendicular to each other as shown in FIG. 8, and the azimuth angle is a minimum. However, as the heads WH and RH move towards the intermediate portion B and the outer peripheral portion C of the magnetic disk 100, the azimuth angle increases as shown in FIGS. 9 and 10. In addition, a width of an overlap OL of the two adjacent tracks $T_n$ and $T_{n+1}$ in the radial direction of the magnetic disk 100 when the write head WH scans the adjacent tracks $T_n$ and $T_{n+1}$ is set larger towards the outer peripheral side of the magnetic disk 100, that is, set larger as the azimuth angle becomes larger. The width of the overlap OL of the adjacent tracks $T_n$ and $T_{n+1}$ is a minimum at the inner peripheral side of the magnetic disk 100 where the azimuth angle becomes a minimum, and is a maximum at the outer peripheral side of the magnetic disk 100 where the azimuth angle becomes a maximum.

The overlap OL of the adjacent tracks $T_n$ and $T_{n+1}$ is a region which is not used for the signal reproduction, but the track pitch can be reduced by the overlapping region. The effects of the crosstalk from the adjacent track can be suppressed by setting the effective track width ETW to a sum of the width of the read head RH and the width of the dead space DS which is provided to reduce the crosstalk from the adjacent track. The overlap OL of the adjacent tracks $T_n$ and $T_{n+1}$ is the minimum at the inner peripheral side of the magnetic disk 100, and the dead space DS for reducing the crosstalk from the adjacent track is provided at the inner peripheral side of the magnetic disk 100 if necessary.

The amount of crosstalk from the adjacent track is dependent on the reproducing frequency, and in general, the amount of crosstalk from the adjacent track is larger at lower reproducing frequencies. In addition, when an attempt is made to improve the recording density by changing the recording and reproducing frequency at the inner peripheral side and the outer peripheral side of the magnetic disk, it is possible to improve the recording density by setting the track pitch through optimization of the relationship between the recording and reproducing frequency and the azimuth angle. However, it is in some cases difficult to increase the recording density to a maximum by merely setting the track pitch through optimization of the relationship between the recording and reproducing frequency and the azimuth angle. Therefore, in this embodiment, the center along the width of the write head and the center along the width of the read head are offset approximately in the radial direction of the magnetic disk, so as to increase the degree of freedom of design when optimizing the recording density.

As may be seen from FIGS. 6 and 9, a distance between the end face of the write head WH which scans one track and the end face of the read head RH which scans a track adjacent to this one track is not always the same on both sides of the heads WH and RH. Hence, in the second and third embodiments of the magnetic disk, the width of the overlap OL of the adjacent tracks, that is, the width of the overlapping region in the radial direction of the magnetic disk 100, is determined to a value proportional to a smaller one of the distances between the corresponding end faces of the heads WH and RH which respectively scan the adjacent tracks on both sides of the heads WH and RH. In other words, when the dead space is provided between the adjacent tracks, the width of the overlapping region is set to a value which is proportional to a smaller one of the sum of the width of the dead space and the width of the overlapping region provided on one side of one track and the sum of the width of the dead space and the width of the overlapping region provided on the other side of this one track. At a radial position on the magnetic disk 100 where the distance between the corresponding end faces of the heads WH and RH which respectively scan the adjacent tracks is the same on both sides of the heads WH and RH, the width of the overlapping region in the radial direction of the magnetic disk 100 becomes a maximum as shown in FIGS. 5 and 10.

In the first through third embodiments described above, the azimuth angle is a minimum at the inner peripheral side of the magnetic disk. However, the present invention is similarly applicable to a magnetic disk having a minimum azimuth angle at the outer peripheral side of the magnetic disk or at the intermediate portion of the magnetic disk. That is, the gist of the present invention is to change the track pitch depending on the azimuth angle so as to improve the recording density of the magnetic disk. For this reason, the magnetic disk may be provided with a plurality of recording regions, and the track pitch may be set to different values for each of the recording regions depending on the azimuth angle. Alternatively, the track pitch may be changed in steps or changed continuously within at least one of a plurality of recording regions provided on the magnetic disk, depending on the azimuth angle. In addition, the track pitch may also be changed in steps or change continuously over a plurality of recording regions provided on the magnetic disk.

Furthermore, it is not essential for the width of the overlap OL of the adjacent tracks to become a maximum at the inner peripheral side or the outer peripheral side of the magnetic disk, and the width of the overlap OL of the adjacent tracks may become a maximum at the intermediate portion of the magnetic disk. A description will now be given of an embodiment of the magnetic disk wherein the width of the overlap of the adjacent tracks becomes a maximum at the intermediate portion of the magnetic disk.

Figure 11:
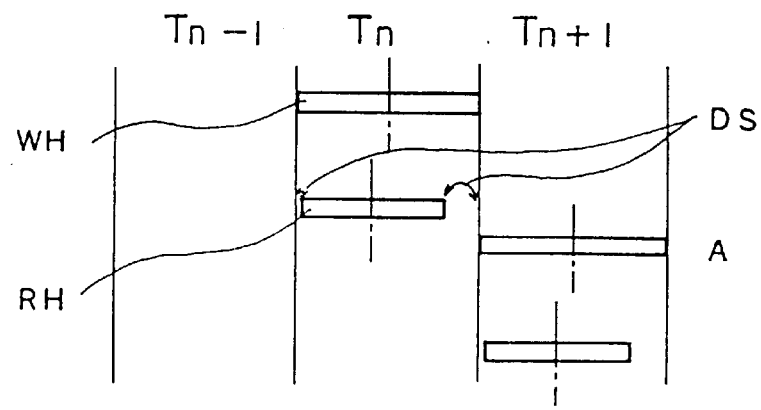
FIG. 11 is a diagram, on an enlarged scale, showing a case where the write head and the read head are positioned on a track at an inner peripheral portion of a fourth embodiment of the magnetic disk according to the present invention.
Figure 12:
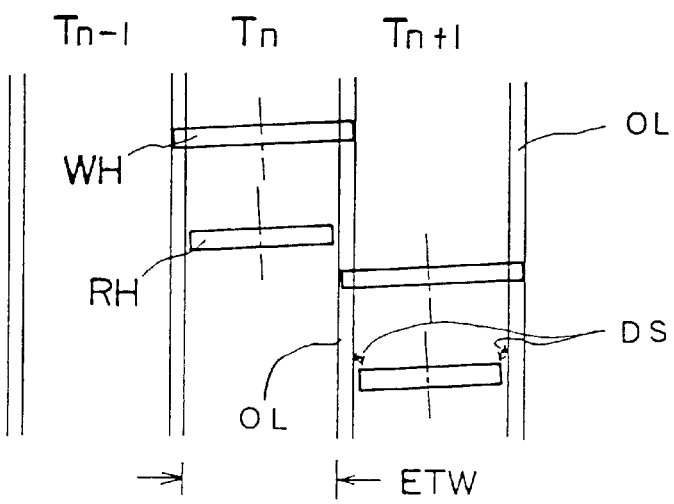
FIG. 12 is a diagram, on an enlarged scale, showing a case where the write head and the read head are positioned on a track at an intermediate portion of the fourth embodiment of the magnetic disk.
Figure 13:
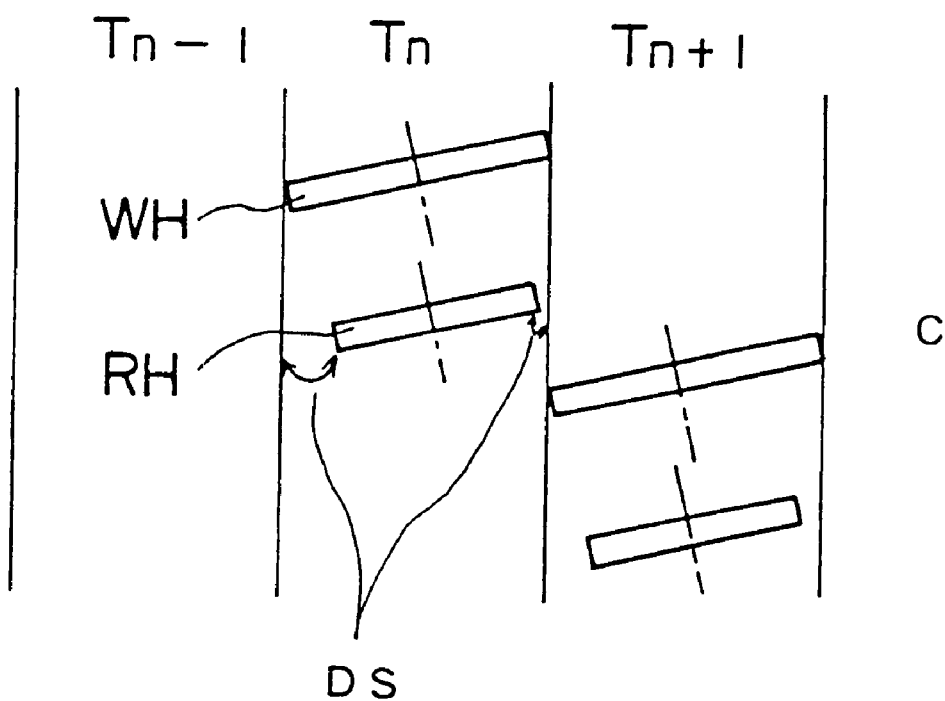
FIG. 13 is a diagram, on an enlarged scale, showing a case where the write head and the read head are positioned on a track at an outer peripheral portion of the fourth embodiment of the magnetic disk.

More particularly, a description will now be given of a fourth embodiment of the magnetic disk according to the present invention, by referring to FIGS. 11 through 13. In FIGS. 11 through 13, those parts which are the same as those corresponding parts in FIGS. 8 through 10 are designated by the same reference numerals, and a description thereof will be omitted.

In this embodiment, similarly to the third embodiment of the magnetic disk described above, the signals are recorded on the magnetic disk 100 in a state where the center along the width of the write head WH and the center along the width of the read head RH are offset approximately along the radial direction of the magnetic disk 100. In this case, the reproducing region of the read head RH shifts towards the recording region of the write head WH, that is, towards the edge portion of the recorded track, as the read head RH moves towards the inner peripheral side of the magnetic disk 100 where the azimuth angle becomes smaller. For this reason, in order to suppress the effects of the crosstalk from the adjacent track, the track pitch is set to a sum of the width of the write head WH and the width of the dead space DS which is provided to reduce the crosstalk from the adjacent track, at least at the inner peripheral portion A of the magnetic disk 100 shown in FIG. 1. In other words, at the inner peripheral portion A of the magnetic disk 100, the write head WH records the signals so that the adjacent tracks do not overlap. By setting the track pitch in this manner, the read head RH will not reproduce the adjacent track even if the read head RH shifts towards the edge portion of the track at the inner peripheral portion A. As a result, it is possible to suppress the effects of the crosstalk from the adjacent track, and a satisfactory S/N ratio of the reproduced signals can be maintained.

On the other hand, since the azimuth angle increases towards the outer peripheral side of the magnetic disk 100 shown in FIG. 1, the read head RH will not shift towards the edge portion of the track at the intermediate portion B of the magnetic disk 100, and the center of the scanned track and the center of the read head RH approximately match. For this reason, at the intermediate portion B of the magnetic disk 100, it is possible to suppress the effects of the crosstalk from the adjacent track by setting the effective track width ETW to a sum of the width of the read head RH and the width of the dead space DS which is provided to reduce the crosstalk from the adjacent track. In other words, at the intermediate portion B of the magnetic disk 100, it is possible to maintain a satisfactory S/N ratio of the reproduced signals even if the track pitch is set smaller than that at the inner peripheral portion A of the magnetic disk 100, and thus, the recording density of the magnetic disk 100 can be improved without sacrificing the S/N ratio of the reproduced signals. Therefore, in this embodiment, the track pitch is set to a minimum at the intermediate portion B of the magnetic disk 100, and the write head WH records the signals so that the adjacent tracks overlap at the intermediate portion B of the magnetic disk 100.

In addition, in FIG. 1, although the azimuth angle further increases at the outer peripheral portion C of the magnetic disk 100 as compared to that at the intermediate portion B of the magnetic disk 100, the extent of the shift of the read head RH towards the edge portion of the track at the outer peripheral portion C is approximately the same as that when scanning the track at the inner peripheral portion A of the magnetic disk 100. For this reason, at the outer peripheral portion C of the magnetic disk 100, the track pitch is set to a sum of the width of the write head WH and the width of the dead space DS which is provided to reduce the crosstalk from the adjacent track. In other words, the write head WH records the signals so that the adjacent tracks do not overlap at the outer peripheral portion C of the magnetic disk 100. As a result, even if the read head RH shifts towards the edge portion of the track at the outer peripheral portion C of the magnetic disk 100, the read head RH will not reproduce the adjacent track, and it is possible to suppress the effects of the crosstalk from the adjacent track and to maintain a satisfactory S/N ratio of the reproduced signals at the outer peripheral portion C of the magnetic disk 100.

FIG. 11 is a diagram, on an enlarged scale, showing a case where the write head WH and the read head RH provided on the actuator 1 are positioned on the tracks $T_n$ and $T_{n+1}$ at the inner peripheral portion A of the magnetic disk 100. FIG. 12 is a diagram, on an enlarged scale, showing a case where the write head WH and the read head RH are positioned on the tracks $T_n$ and $T_{n+1}$ at the intermediate portion B of the magnetic disk 100. Further, FIG. 13 is a diagram, on an enlarged scale, showing a case where the write head WH and the read head RH are positioned on the tracks $T_n$ and $T_{n+1}$ at the outer peripheral portion C of the magnetic disk 100.

In this embodiment, when the write head WH and the read head RH are positioned on the track at the inner peripheral portion A of the magnetic disk 100, the direction taken along the width of each of the heads WH and RH and the direction in which the track extends are approximately perpendicular to each other as shown in FIG. 11, and the azimuth angle is a minimum. However, as the heads WH and RH move towards the intermediate portion B and the outer peripheral portion C of the magnetic disk 100, the azimuth angle increases as shown in FIGS. 12 and 13. In addition, a width of an overlap OL of the two adjacent tracks $T_n$ and $T_{n+1}$ in the radial direction of the magnetic disk 100 when the write head WH scans the adjacent tracks $T_n$ and $T_{n+1}$ is set larger towards the intermediate part of the magnetic disk 100, that is, set larger as the azimuth angle becomes an approximately an intermediate value between the maximum and minimum values. The width of the overlap OL of the adjacent tracks $T_n$ and $T_{n+1}$ is a maximum at the intermediate part of the magnetic disk 100 where the azimuth angle becomes the approximate intermediate value between the maximum and minimum values, and decreases towards the outer peripheral side of the magnetic disk 100 where the azimuth angle becomes a maximum and also decreases towards the inner peripheral side of the magnetic disk 100 where the azimuth angle becomes a minimum. The overlap OL of the adjacent tracks $T_n$ and $T_{n+1}$ is a region which is not used for the signal reproduction, but the track pitch can be reduced by the overlapping region. The effects of the crosstalk from the adjacent track can be suppressed by setting the effective track width ETW to a sum of the width of the read head RH and the width of the dead space DS which is provided to reduce the crosstalk from the adjacent track. The overlap OL of the adjacent tracks $T_n$ and $T_{n+1}$ is the minimum at the inner and outer peripheral sides of the magnetic disk 100, and the dead space DS for reducing the crosstalk from the adjacent track is provided at the inner and outer peripheral sides of the magnetic disk 100 if necessary.

The amount of crosstalk from the adjacent track is dependent on the reproducing frequency, and in general, the amount of crosstalk from the adjacent track is larger at lower reproducing frequencies. In addition, when an attempt is made to improve the recording density by changing the recording and reproducing frequency at the inner peripheral side and the outer peripheral side of the magnetic disk, it is possible to improve the recording density by setting the track pitch through optimization of the relationship between the recording and reproducing frequency and the azimuth angle. However, it is in some cases difficult to increase the recording density to a maximum by merely setting the track pitch through optimization of the relationship between the recording and reproducing frequency and the azimuth angle.

Therefore, in this embodiment, the center along the width of the write head and the center along the width of the read head are offset approximately in the radial direction of the magnetic disk, so as to increase the degree of freedom of design when optimizing the recording density.

Next, a description will be given of a first embodiment of a magnetic disk unit according to the present invention. This first embodiment of the magnetic disk unit employs a first embodiment of a magnetic recording and reproducing method according to the present invention.

Figure 14:
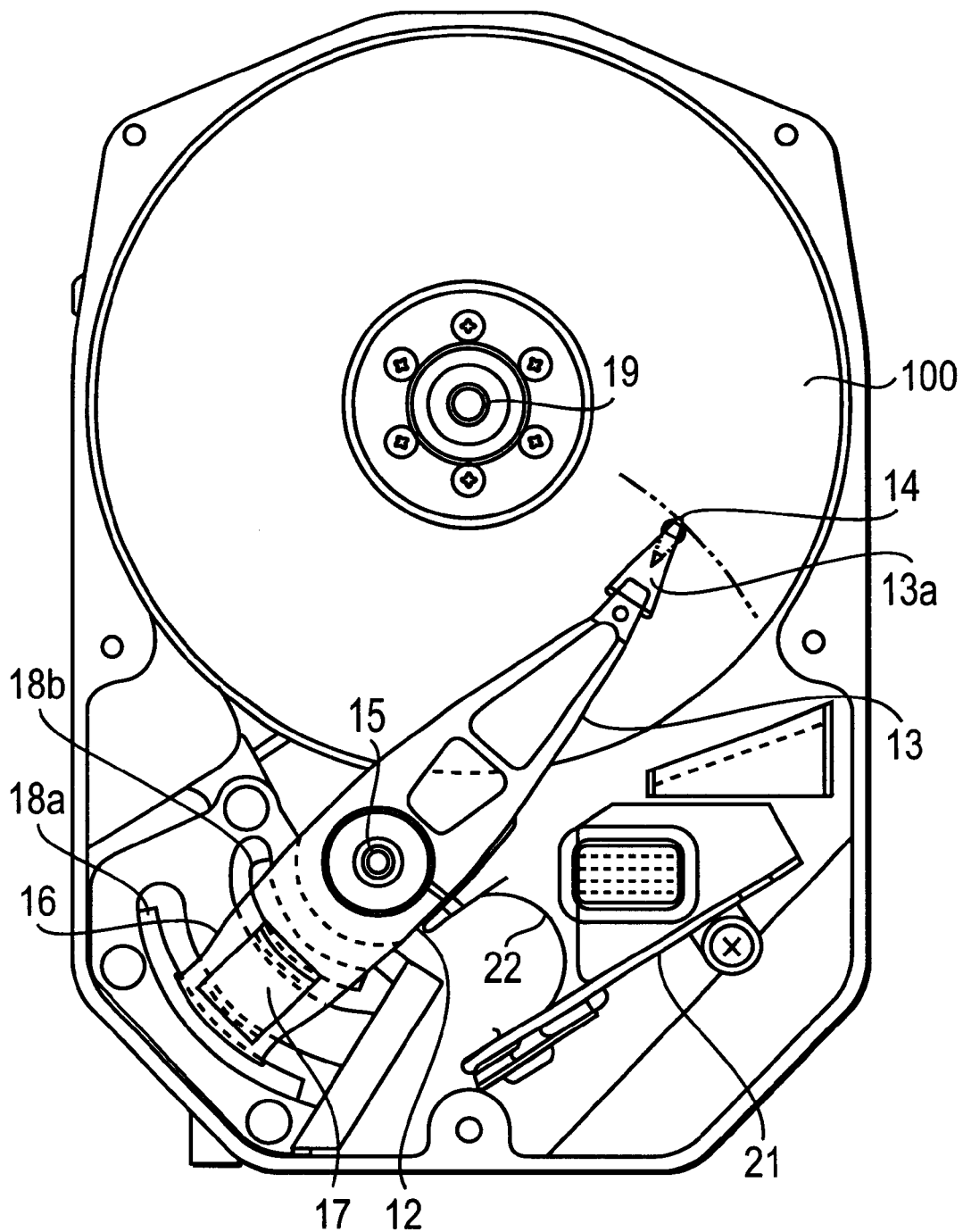
FIG. 14 is a plan view showing an important part of a first embodiment of a magnetic disk unit according to the present invention with a top cover thereof removed.

FIG. 14 is a plan view showing an important part of the first embodiment of the magnetic disk unit with a top cover thereof removed. In a magnetic disk unit 11 shown in FIG. 14, a base part of an arm 13 is rotatably supported by a pivot 15, and this arm 13 is turned by an actuator 12. A magnetic head 14 is mounted on a tip end of the arm 13 via a support spring mechanism 13a.

A rotary support part 16 is provided on the arm 13 at the end opposite to the tip end relative to the pivot 15, and a coil 17 is wound on the rotary support part 16. Two magnets 18a and 18b are fixedly arranged below the coil 17. A voice coil motor (VCM) is formed by the coil 17 and the magnets 18a and 18b.

With respect to the magnetic disk 100 which is fixed to and is rotated by a spindle 19 of a sensorless type spindle motor, the above described actuator 12 turns the arm 13 so as to move the magnetic head 14 in the radial direction of the magnetic disk 100 by applying a current to the coil 17 from a wiring board 21 via a flexible printed circuit 22.

Since the MR head which realizes the high density recording uses the MR element is used exclusively for reading signals, the magnetic head 14 is made of a composite thin film magnetic head which is a combination of the MR head (read head) and the thin film head (write head).

Figure 15A:
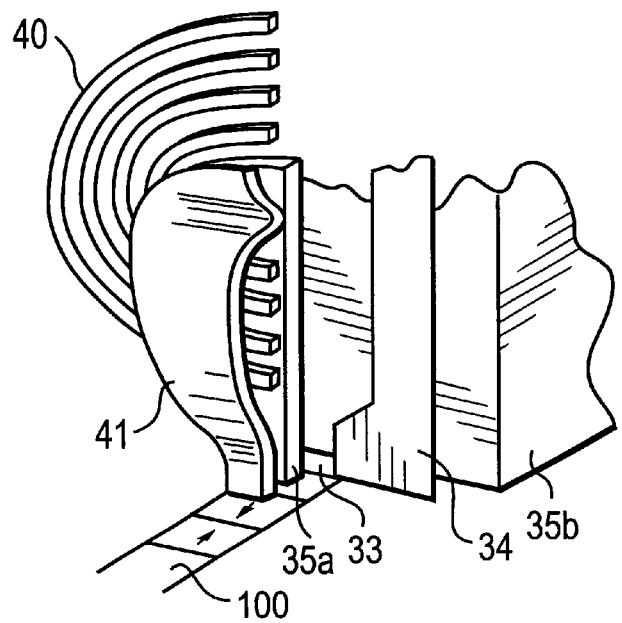
FIGS. 15A and 15B respectively are a perspective view in cross section with a part cut away, and a cross sectional view, showing the construction of a composite thin film magnetic head.
Figure 15B:
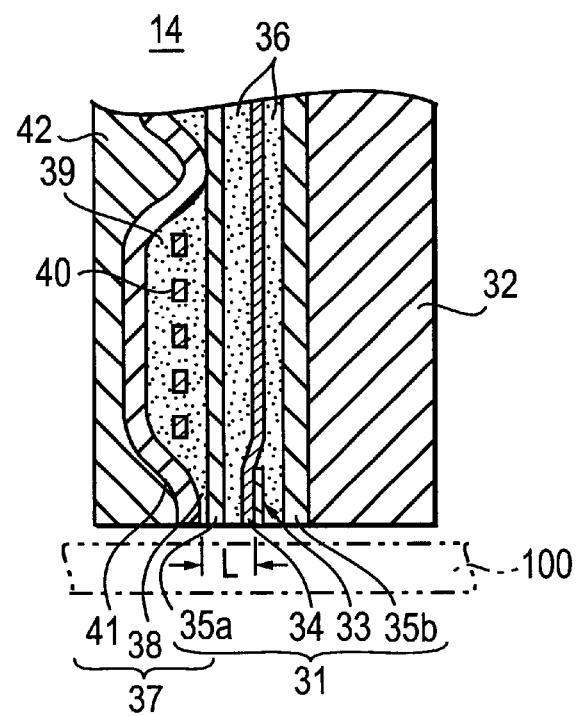

FIGS. 15A and 15B respectively are a perspective view in cross section with a part cut away, and a cross sectional view, showing the construction of the composite thin film magnetic head. In a composite thin film magnetic head 14 shown in FIGS. 15A and 15B, a MR head 31 includes a rectangular MR element 33 formed on a non-magnetic substrate 32, a draw-out conductor layer 34 of the MR element 33, and upper and lower magnetic shield layers 35a and 35b.

The draw-out conductor layer 34 is cut to a predetermined width with respect to the longitudinal direction of the MR element 33, and is connected to both ends of the MR element 33. The MR element 33 and the draw-out conductor layer 34 are provided between the upper and lower shield layers 35a and 35b, and are electrically isolated by a non-magnetic insulator layer 36.

An electromagnetic conversion type write head (inductive head) 37 records signals on the magnetic disk 100. The upper magnetic shield layer 35a of the MR head 31 is used as a lower magnetic pole of the inductive head 37. An interlayer insulator layer 39 made of a thermosetting resin, a thin film coil conductor layer 40 made of Cu, and an upper magnetic pole 41 made of NiFe are successively stacked on the top surface of the upper magnetic shield layer (lower magnetic pole) 35a via a recording gap 38 having alumina ($Al_2O_3$) interposed therebetween. The signals are recorded by the recording gap 38 formed between the upper magnetic pole 41 and the lower magnetic pole (upper magnetic shield layer 35a). In addition, a projecting insulator layer 42 is formed on the upper magnetic pole 41.

Accordingly, the composite thin film magnetic head 14 includes the MR head 31 and the inductive head 37 which are combined in the longitudinal direction of the track of the magnetic disk 100, and the recording gap 38 of the inductive head 37 and the MR element 33 are separated by a distance L.

Of course, a plurality of magnetic disks 100 may be provided within the disk unit 11.

FIG. 16 is a system block diagram showing the general construction of the control system of the first embodiment of the magnetic disk unit. In the magnetic disk unit 11 shown in FIG. 16, the magnetic disk 100 is rotated at a predetermined rotational speed by a D.C. motor (DCM) 53. A VCM 54 moves the magnetic head 14 in the radial direction of the magnetic disk 100 via the actuator 12 and the arm 13 shown in FIG. 14. The magnetic head 14 is a composite thin film magnetic head which is a combination of the MR head 31 and the inductive head 37 as described above in conjunction with FIG. 15.

A servo signal read from the magnetic disk 100 by the MR head 31 of the magnetic head 14 is supplied to a servo demodulation circuit 57 via a head integrated circuit (IC) 56. The servo demodulation circuit 57 converts the servo signal into a position signal, and supplies the position signal to an analog-to-digital converter (ADC) 58. The ADC 58 converts the position signal into a digital position signal, and supplies the digital position signal to a digital signal processor (DSP) 59. In addition, the DSP 59 also receives track pitch information (TPI) which is read from a TPI table 62 which prestores the TPI. For example, the TPI table 62 is made of a read only memory (ROM), and prestores data indicating the relationship between the radial position on the magnetic disk 100 and the TPI. Accordingly, based on the digital position signal from the ADC 58, the DSP 59 reads the corresponding TPI from the TPI table 62.

The DSP 59 generates a digital control signal for driving the VCM 54 based on the TPI read from the TPI table 62, and supplies the digital control signal to a digital-to-analog (DAC) 60. The DAC 60 converts the digital control signal into an analog control signal, and supplies the analog control signal to a VCM driving circuit 61. The VCM 54 is driven by a driving signal from the VCM driving circuit 61. A DCM control circuit 63 is provided in order to rotate the DCM 53 at a constant rotational speed.

A data recording system and a data reproducing system of the magnetic disk unit 11 are not directly related to the subject matter of the present invention, and for this reason, illustration and description thereof will be omitted.

Figure 17:
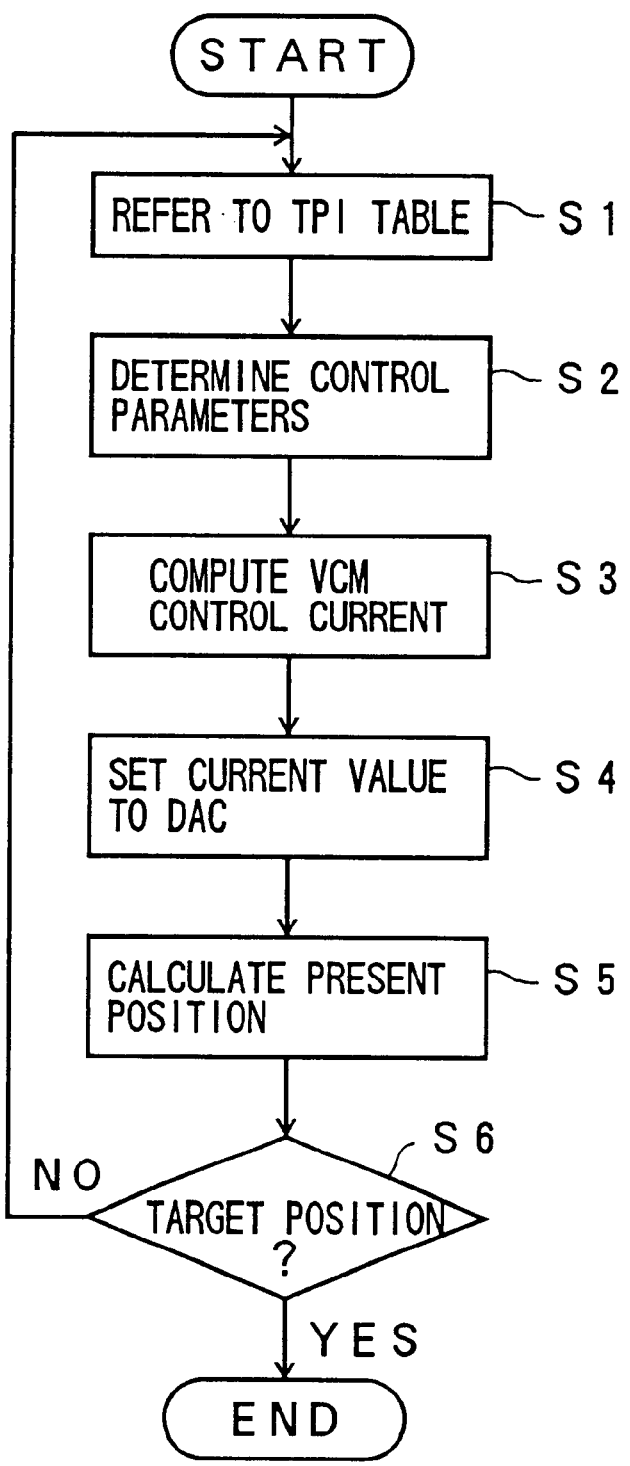
FIG. 17 is a flow chart for explaining the seek operation of a digital signal processor.

FIG. 17 is a flow chart for explaining a seek operation of the DSP 59. In FIG. 17 a step S1 reads the corresponding TPI from the TPI table 62 based on the present scan position which is indicated by the digital position signal from the ADC 58.

In this embodiment, it is assumed for the sake of convenience that the signal recording and reproduction are carried out with respect to the first embodiment of the magnetic disk described above. Hence, the TPI table 62 prestores the TPI which indicates the track pitch as becoming smaller as the radial position on the magnetic disk 100 moves towards the inner peripheral side of the magnetic disk 100 from the outer peripheral side of the magnetic disk 100. The track pitch may become smaller in steps or continuously towards the inner peripheral side of the magnetic disk 100.

A step S2 determines control parameters based on the TPI. A step S3 computes a VCM control current value based on the control parameters determined by the step S2. A step S4 sets the VCM control current value computed by the step S3 with respect to the DAC 60, and controls the VCM 54 via the VCM driving circuit 61.

A step S5 calculates the present position of the magnetic head 14 on the magnetic disk 100. For example, the radial position on the magnetic disk 100 is calculated by accumulating the distances moved by the magnetic head 14, based on the digital position signal from the ADC 58. A step S6 decides whether or not the present position calculated by the step S5 is a target position, and the process ends if the decision result in the step S6 is YES. On the other hand, the process returns to the step S1 if the decision result in the step S6 is NO.

Next, a description will be given of a second embodiment of the magnetic disk unit according to the present invention. This second embodiment of the magnetic disk unit employs a second embodiment of the magnetic recording and reproducing method according to the present invention.

The construction of the second embodiment of the magnetic disk unit is the same as that of the first embodiment of the magnetic disk unit, and illustration and description thereof will be omitted.

In this second embodiment of the magnetic disk unit, the TPI prestored in the TPI table 62 is different from that of the first embodiment of,the magnetic disk unit described above.

In this embodiment, it is assumed for the sake of convenience that the signal recording and reproduction are carried out with respect to the second embodiment of the magnetic disk described above. Hence, the TPI table 62 prestores TPI which indicates the track pitch as becoming smaller as the radial position on the magnetic disk 100 moves towards the inner peripheral side of the magnetic disk 100 from the outer peripheral side of the magnetic disk 100, and indicates the width of the overlap OL of the adjacent tracks in the radial direction of the magnetic disk 100 as becoming larger as the radial position on the magnetic disk 100 moves towards the inner peripheral side of the magnetic disk 100. The track pitch may become smaller in steps or continuously towards the inner peripheral side of the magnetic disk 100. Similarly, the width of the overlap OL of the adjacent tracks may become larger in steps or continuously towards the inner peripheral side of the magnetic disk 100.

Next, a description will be given of a third embodiment of the magnetic disk unit according to the present invention. This third embodiment of the magnetic disk unit employs a third embodiment of the magnetic recording and reproducing method according to the present invention.

The construction of the third embodiment of the magnetic disk unit is the same as that of the first embodiment of the magnetic disk unit, and illustration and description thereof will be omitted.

In this third embodiment of the magnetic disk unit, the TPI prestored in the TPI table 62 is different from that of the first embodiment of the magnetic disk unit described above.

In this embodiment, it is assumed for the sake of convenience that the signal recording and reproduction are carried out with respect to the third embodiment of the magnetic disk described above. Hence, the TPI table 62 prestores TPI which indicates the track pitch as becoming larger as the radial position on the magnetic disk 100 moves towards the inner peripheral side of the magnetic disk 100 from the outer peripheral side of the magnetic disk 100, and indicates the width of the overlap OL of the adjacent tracks in the radial direction of the magnetic disk 100 as becoming smaller as the radial position on the magnetic disk 100 moves towards the inner peripheral side of the magnetic disk 100. The track pitch may become larger in steps or continuously towards the inner peripheral side of the magnetic disk 100. Similarly, the width of the overlap OL of the adjacent tracks may become smaller in steps or continuously towards the inner peripheral side of the magnetic disk 100.

If the track pitch differs depending on the radial position on the magnetic disk, the position sensitivity of the magnetic head changes, thereby changing a loop gain of the control system during the seek operation and there is a possibility that an appropriate control will not be carried out. In such a case, it is possible to employ a method proposed in a Japanese Laid-Open Patent Application No. 5-282818, for example, so as to correct the loop gain including fluctuations caused by other causes. In addition, it is also possible to set the TPI prestored in the TPI table 62 so as to correct the change in the position sensitivity of the magnetic head.

In the case of the magnetic disk wherein the azimuth angle is approximately zero at the outer peripheral side or the intermediate part of the magnetic disk, the TPI prestored in the TPI table 62 may be set depending on the change of the track pitch on the magnetic disk.

In addition, the magnetic recording and reproducing method according to the present invention and the magnetic disk unit according to the present invention are of course not limited to the application to the above described embodiments of the magnetic disk, and are similarly applicable to other magnetic disks.

Further, the present invention is not limited to these embodiments, but various variations and modifications may be made without departing from the scope of the present invention.

What is claimed is:

1. A magnetic disk on which signals are recorded on and reproduced from a head with an azimuth angle which gradually changes depending on a radial position on the magnetic disk, the head having a read core width and a write core width larger than the read core width, said magnetic disk comprising:

a first recording region having tracks recorded with an azimuth angle less than or equal to a predetermined value;

a second recording region having tracks recorded with an azimuth angle greater than the predetermined value; and an overlapping region which is not reproduced by the head, and in which two mutually adjacent tracks, which are both recorded and both reproduced by the head, overlap in a radial direction of the magnetic disk, a track pitch of the tracks within said first recording region being different from a track pitch of the tracks within said second recording region, wherein a width of an overlapping region within said first recording region in the radial direction of the magnetic disk is different from a width of an overlapping region within said second recording region in the radial direction of the magnetic disk.

2. The magnetic disk as claimed in claim 1, which further comprises:

a dead space provided between two mutually adjacent tracks, a width of said overlapping region in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

3. The magnetic disk as claimed in claim 1, wherein the track pitch changes dicontinauosly or continuously within one of said first and second recording regions depending on the azimuth angle.

4. A magnetic recording and reproducing method for recording signals on and reproducing signals from a magnetic disk by a head having an azimuth angle which gradually changes depending on a radial position on the magnetic disk, the head having a read core width and a write core width larger than the read core width, said magnetic recording and reproducing method comprising the steps of:

(a) recording signals on tracks having a first track pitch with an azimuth angle less than or equal to a predetermined value with respect to a first recording region of the magnetic disk, and recording signals on tracks having a second track pitch which is different from the first track pitch with an azimuth angle greater than the predetermined value with respect to a second recording region of the magnetic disk, said first recording region being different from said second recording region; and (b) reproducing signals from the first recording region with the azimuth angle less than or equal to the predetermined value, and reproducing signals from the second recording region with the azimuth angle greater than the predetermined value, said step (a) recording the signals on each of the tracks so that two mutually adjacent tracks, which are both recorded and both reproduced by the head, overlap in a radial direction of the magnetic disk within an overlapping region located in at least a part of the first recording region, the overlapping region not being reproduced by the head, wherein said step (a) records signals on each of the tracks so that a width of an overlapping region within said first recording region in the radial direction of the magnetic disk is different from a width of an overlapping region within said second recording region in the radial direction of the magnetic disk.

5. The magnetic recording and reproducing method as claimed in claim 4, herein said step (a) records signals on each of the tracks so that a dead space is provided between two mutually adjacent tracks, a width of said overlapping region in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

6. The magnetic recording and reproducing method as claimed in claim 4, wherein said step (a) records signals on each of the tracks so that the track pitch changes in steps or continuously within one of said first and second recording regions depending on the azimuth angle.

7. The magnetic recording and reproducing method as claimed in claim 4, wherein said step (a) uses a write head having a first width which is greater than a second width of a read head used by said step (b), said first width and said second width being taken generally along the radial direction of the magnetic disk.

8. A magnetic recording and reproducing method for recording signals on and reproducing signals from a magnetic disk by a head having an azimuth angle which gradually changes depending on a radial position on the magnetic disk, the head recording and reproducing mutually adjacent tracks on the disk, the head having a read core width and a write core width larger than the read core width, said magnetic recording and reproducing method comprising the steps of:

(a) recording signals on tracks having a first track pitch with an azimuth angle less than or equal to a predetermined value with respect to a first recording region of the magnetic disk, and recording signals on tracks having a second track pitch which is different from the first track pitch with an azimuth angle greater than the predetermined value with respect to a second recording region of the magnetic disk, said first recording region being different from said second recording region; and (b) reproducing signals from the first recording region with the azimuth angle less than or equal to the predetermined value, and reproducing signals from the second recording region with the azimuth angle greater than the predetermined value, said step (b) using a read head having a center which is offset generally in a radial direction of the magnetic disk with respect to a center of a write head used by said steps (a), wherein said step (a) records signals on each of the tracks so that a width of an overlapping region where two mutually adjacent tracks overlap within said first recording region in the radial direction of the magnetic disk is different from a width of an overlapping region within said second recording region in the radial direction of the magnetic disk.

9. The magnetic recording and reproducing method as claimed in claim 8, wherein said step (a) records signals on each of the tracks so that a dead space is provided between two mutually adjacent tracks, a width of an overlapping region where two mutually adjacent tracks overlap in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

10. The magnetic recording and reproducing method as claimed in claim 8, wherein said step (a) records signals on each of the tracks so that the first track pitch is smaller than the second track pitch.

11. The magnetic recording and reproducing method as claimed in claim 8, in claim wherein said step (a) uses a write head having a first width which is greater than a second width of a read head used by said step (b), said first width and said second width being taken generally along the radial direction of the magnetic disk.

12. A magnetic recording and reproducing method for recording signals on and reproducing signals from a magnetic disk by a head having an azimuth angle which gradually changes depending on a radial position on the magnetic disk, the head recording and reproducing mutually adjacent tracks on the disk, the head having a read core width and a write core width larger than the read core width, said magnetic recording and reproducing method comprising the steps of:

(a) recording signals on tracks having a first track pitch with an azimuth angle less than or equal to a predetermined value with respect to a first recording region of the magnetic disk, and recording signals on tracks having a second track pitch which is different from the first track pitch with an azimuth angle greater than the predetermined value with respect to a second recording region of the magnetic disk, said first recording region being different from said second recording region; and (b) reproducing signals from the first recording region with the azimuth angle less than or equal to the predetermined value, and reproducing signals from the second recording region with the azimuth angle greater than the predetermined value, wherein said step (a) records signals on each of the tracks so that a width of an overlapping region where two mutually adjacent tracks overlap within said first recording region in the radial direction of the magnetic disk is different from a width of an overlapping region within said second recording region in the radial direction of the magnetic disk.

13. The magnetic recording and reproducing method as claimed in claim 12, wherein said step (a) records signals on each of the tracks so that a dead space is provided between two mutually adjacent tracks, a width of an overlapping region where two mutually adjacent tracks overlap in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

14. The magnetic recording and reproducing method as claimed in claim 12, wherein said step (b) uses a read head having a center which is offset generally in a radial direction of the magnetic disk with respect to a center of a write head used by said step (a).

15. The magnetic recording and reproducing method as claimed in claim 12, herein said step (a) uses a write head having a first width which is greater than a second width of a read head used by said step (b), said first width and said second width being taken generally along the radial direction of the magnetic disk.

16. A magnetic disk unit for recording signals on and reproducing signals from a magnetic disk using a head having an azimuth angle which gradually changes depending on a radial position on the magnetic disk, the head recording and reproducing mutually adjacent tracks on the disk, the head recording and reproducing mutually adjacent tracks on the disk, said magnetic disk unit comprising:

a write head which records signals on the tracks of the magnetic disk;

a read head which reproduces signals from the tracks;

said write head having a write core width larger than a read core width of said read head;

a moving mechanism moving said write head and said read head generally in a radial direction of the magnetic disk in a state where said write head and said read head are separated in a direction approximately perpendicular to the radial direction of the magnetic disk; and control means for controlling an amount said write head and said read head are moved by said moving mechanism, said control means controlling said moving mechanism so that said write head records signals on tracks having a first track pitch with an azimuth angle less than or equal to a predetermined value with respect to a first recording region of the magnetic disk, and records signals on tracks having a second track pitch which is different from the first track pitch with an azimuth angle greater than the predetermined value with respect to a second recording region of the magnetic disk, so that two mutually adjacent tracks overlap in the radial direction of the magnetic disk within an overlapping region which is not reproduced by said read head and is located in at least a part of said first recording region, said first recording region being different from said second recording region, said control means controlling said moving mechanism so that said read head reproduces signals from the first recording region with the azimuth angle less than or equal to the predetermined value, and reproduces signals from the second recording region with the azimuth angle greater than the predetermined value, wherein said control means controls said moving mechanism so that said write head records signals on each of the tracks such that a width of an overlapping region within said first recording region in the radial direction of the magnetic disk is different from a width of an overlapping region within said second recording region in the radial direction of the magnetic disk.

17. The magnetic disk unit as claimed in claim 16, wherein said control means controls said moving mechanism so that said write head records signals on each of the tracks to form a dead space between two mutually adjacent tracks, a width of said overlapping region in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

18. The magnetic disk unit as claimed in claim 16, wherein said control means controls said moving mechanism so that said write head records signals on each of the tracks such that the track pitch changes in steps or continuously within one of said first and second recording regions depending on the azimuth angle.

19. The magnetic disk unit as claimed in claim 16, wherein said write head has a first width which is greater than a second width of said read head, said first width and said second width being taken generally along the radial direction of the magnetic disk.

20. A magnetic disk unit for recording signals on and reproducing signals from a magnetic disk using a head having an azimuth angle which gradually changes depending on a radial position on the magnetic disk, the head recording and reproducing mutually adjacent tracks, said magnetic disk unit comprising:
   a write head which records signals on the tracks of the magnetic disk;
   a read head which reproduces signals from the tracks;
   said write head having a write core width larger than a read core width of said read head;
   a moving mechanism moving said write head and said read head generally in a radial direction of the magnetic disk in a state where said write head and said read head are separated in a direction approximately perpendicular to the radial direction of the magnetic disk; and
   control means for controlling an amount said write head and said read head are moved by said moving mechanism,
      said control means controlling said moving mechanism so that said write head records signals on tracks having a first track pitch with an azimuth angle less than or equal to a predetermined value with respect to a first recording region of the magnetic disk, and records signals on tracks having a second track pitch which is different from the first track pitch with an azimuth angle greater than the predetermined value with respect to a second recording region of the magnetic disk, so that two mutually adjacent tracks overlap in the radial direction of the magnetic disk within an overlapping region located in at least a part of said first recording region, said first recording region being different from said second recording region,
      said control means controlling said moving mechanism so that said read head reproduces signals from the first recording region with the azimuth angle less than or equal to the predetermined value, and reproduces signals from the second recording region with the azimuth angle greater than the predetermined value,
      said read head having a center which is offset generally in the radial direction of the magnetic disk with respect to a center of said write head,
      wherein said control means controls said moving mechanism so that said write head records signals on each of the tracks such that a width of an overlapping region within said first recording region in the radial direction of the magnetic disk is different from a width of an overlapping region within said second recoding region in the radial direction of the magnetic disk.

21. The magnetic disk unit as claimed in claim 20, wherein said control means controls said moving mechanism so that said write head records signals on each of the tracks such that a dead space is provided between two mutually adjacent tracks,
   a width of said overlapping region in the radial direction of the magnetic disk being proportional to a smaller one of first and second sums,
      said first sum being a sum of a width of an overlapping region provided on one side of a certain track and a width of said dead space in the radial direction of the magnetic disk,
      said second sum being a sum of a width of an overlapping region provided on the other side of said certain track, and the width of said dead space in the radial direction of the magnetic disk.

22. The magnetic disk unit as claimed in claim 20, wherein said control means controls said moving mechanism so that said write head records signals on each of the tracks so that the first track pitch is smaller than the second track pitch.

23. The magnetic disk unit as claimed in claim 20, wherein said write head has a first width which is greater than a second width of said read head, said first width and said second width being taken generally along the radial direction of the magnetic disk.

24. A magnetic disk unit for recording signals on and reproducing signals from a magnetic disk using a head having an azimuth angle which gradually changes depending on a radial position on the magnetic disk, the head recording and reproducing mutually adjacent tracks, said magnetic disk unit comprising:
   a write head which records signals on the tracks of the magnetic disk;
   a read head which reproduces signals from the tracks;
   said write head having a write core width larger than a read core width of said read head;
   a moving mechanism moving said write head and said read head generally in a radial direction of the magnetic disk in a state where said write head and said read head are separated in a direction approximately perpendicular to the radial direction of the magnetic disk; and
   control means for controlling an amount said write head and said read head are moved by said moving mechanism,
      said control means controlling said moving mechanism so that said write head records signals on tracks having a first track pitch with an azimuth angle less than or equal to a predetermined value with respect to a first recording region of the magnetic disk, and records signals on tracks having a second track pitch which is smaller than the first track pitch with an azimuth angle greater than the predetermined value with respect to a second recording region of the magnetic disk, said first recording region being different from said second recording region,
      said control means controlling said moving mechanism so that said read head reproduces signals from the first recording region with the azimuth angle less than or equal to the predetermined value, and reproduces signals from the second recording region with the azimuth angle greater than the predetermined value,
      wherein said control means controls said moving mechanism so that said write head records signals on each of the tracks so that a width of an overlapping region where two mutually adjacent tracks overlap within said first recording region in the radial direction of the magnetic disk is different from a width of an overlapping region within said second recording region in the radial direction of the magnetic disk.

25. The magnetic disk unit as claimed in claim 24, wherein said control means controls said moving mechanism so that said write head records signals on each of the tracks so that a dead space is provided between two mutually adjacent tracks, a width of an overlapping region where two mutually adjacent tracks overlap in the radial direction of the magnetic disk being proportional to a smaller one of first and second sums, said first sum being a sum of a width of an overlapping region provided on one side of a certain track and a width of said dead space in the radial direction of the magnetic disk, said second sum being a sum of a width of an overlapping region provided on the other side of said certain track, and the width of said dead space in the radial direction of the magnetic disk.

26. The magnetic disk unit as claimed in claim 24, wherein said read head having a center which is offset generally in a radial direction of the magnetic disk with respect to a center of said write head.

27. The magnetic disk unit as claimed in claim 24, wherein said write head has a first width which is greater than a second width of said read head, said first width and said second width being taken generally along the radial direction of the magnetic disk.

\* \* \* \* \*

UNITED STATES PATENT AND TRADEMARK OFFICE
CERTIFICATE OF CORRECTION

PATENT NO. : 6,437,947 B1
DATED : August 20, 2002
INVENTOR(S) : Hiroshi Uno

It is certified that error appears in the above-identified patent and that said Letters Patent is hereby corrected as shown below:

Column 19,
Line 13, please delete "discontinauosly" and insert -- discontinuously --
Line 52, please delete "herein" and insert -- wherein --

Column 20,
Line 66, please delete "claimed 8, in claim" and insert -- claimed in claim 8 --

Column 21,
Line 56, please delete "herein" and insert -- wherein --
Lines 64-66, please delete the sentence that is repeated twice, "the head recording and reproducing mutually adjacent tracks on the disk"

Column 23,
Line 56, please delete "recoding" and insert -- recording --

Signed and Sealed this

Twenty-fifth Day of March, 2003

JAMES E. ROGAN
*Director of the United States Patent and Trademark Office*